(12) United States Patent
Kino et al.

(10) Patent No.: US 8,096,688 B2
(45) Date of Patent: Jan. 17, 2012

(54) IN-VEHICLE ILLUMINATION DEVICE

(75) Inventors: Norihito Kino, Aichi-ken (JP); Satoshi Inagaki, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 328 days.

(21) Appl. No.: 12/385,291

(22) Filed: Apr. 3, 2009

(65) Prior Publication Data

US 2009/0251911 A1 Oct. 8, 2009

(30) Foreign Application Priority Data

Apr. 8, 2008 (JP) ................ P.2008-099844

(51) Int. Cl.
*B60Q 1/26* (2006.01)
(52) U.S. Cl. .............. 362/492; 362/136; 362/488
(58) Field of Classification Search .......... 362/488–494, 362/471, 135–137, 140–144
See application file for complete search history.

(56) References Cited

U.S. PATENT DOCUMENTS

| | | | | |
|---|---|---|---|---|
| 4,586,788 A | * | 5/1986 | Hansen ................. | 359/608 |
| 5,174,644 A | * | 12/1992 | Hermansson et al. ....... | 362/492 |
| 5,283,720 A | * | 2/1994 | Boerema et al. ........... | 362/492 |
| 7,422,352 B2 | * | 9/2008 | Sakakibara ............. | 362/490 |
| 2006/0279959 A1 | * | 12/2006 | Yabashi et al. ........... | 362/490 |
| 2007/0279927 A1 | | 12/2007 | Yamamichi et al. | |

FOREIGN PATENT DOCUMENTS

| | | |
|---|---|---|
| JP | 09-249060 A | 9/1997 |
| JP | 2000-127847 | 5/2000 |
| JP | 2003-81010 A | 3/2003 |
| JP | 2003-118479 | 4/2003 |
| JP | 2007-22141 | 2/2007 |
| JP | 3959917 | 5/2007 |
| JP | 2007-210395 A | 8/2007 |
| JP | 2007-324042 A | 12/2007 |

OTHER PUBLICATIONS

Japanese Office Action dated Jul. 26, 2011 (with an English translation).

* cited by examiner

*Primary Examiner* — Bao Q Truong
(74) *Attorney, Agent, or Firm* — McGinn IP Law Group, PLLC (57) ABSTRACT

In an in-vehicle illumination device including: a room lamp section provided with a first light source section, and a light guide plate that guides a light of the first light source section from an end surface thereof and emits the light from a front surface thereof; a first switch for use by the room lamp section; and a vanity mirror section provided with a mirror, when the first light source section is turned on through operation of the first switch, a mode change is made to a room lamp illumination mode in which a first illumination light comes from the room lamp section, and also when the vanity mirror section is in use, the first light source section is turned on, and a mode change is made to a vanity mirror illumination mode in which a second illumination light comes from the room lamp section. The resulting in-vehicle illumination device can be excellent in practicality with the smaller size, and can achieve improvement in terms of design.

20 Claims, 7 Drawing Sheets

IN-VEHICLE ILLUMINATION DEVICE

BACKGROUND OF THE INVENTION

1. Field of the Invention

The present invention relates to an in-vehicle illumination device and, more specifically, to an improved illumination device in which a room lamp and a mirror (vanity mirror) are integrally provided.

2. Description of the Related Art

In a vehicle, a roof section is provided with an illumination device for illuminating the inside of the vehicle during the night, for example. For use as such an illumination device, commercially available is the one in which a room lamp is integrally provided with a mirror (vanity mirror). Examples include Patent Document 1 (JP-A-2003-118479), and Patent Document 2 (JP-A-2007-22141). Also commercially available is an illumination device provided not only with a room lamp but also with a map lamp, which is used for illumination of limited range of area. There is also an illumination device offering indirect lighting with the high rendering effect, and an example thereof includes Patent Document 3 (U.S. Pat. No. 3,959,917).

The illumination devices of Patent Documents 1 and 2 are indeed reduced in size due to the integral provision of a room lamp and a vanity lamp. A light from the room lamp is utilized also when the vanity mirror is in use so that the vanity mirror is indeed increased in the use of convenience. The light of the room lamp is generally so selected that the color and illuminance thereof suit the illumination inside of a vehicle, and thus the light of the room lamp is not always suited for the use of the vanity mirror. Patent Documents 1 and 2 both describe no such fact, and give no specific consideration about the rendering effect to be produced by the light.

On the other hand, as is mounted to the ceiling of a vehicle, the illumination device is expected to be small in size in view of leaving the inside space of the vehicle large and wide. Any improvement in view of design is also desired therefor because the illumination device is rather often in sight. The illumination device is also expected to be more versatile because consumers' expectations therefor are very high.

SUMMARY OF THE INVENTION

In order to achieve such improvements, an aspect of the invention is directed to an in-vehicle illumination device including: a room lamp section provided with a first light source section, and a light guide plate that guides a light of the first light source section from an end surface thereof and emits the light from a front surface thereof; a first switch for use by the room lamp section; and a vanity mirror section provided with a mirror. In the in-vehicle illumination device, when the first light source section is turned on through operation of the first switch, a mode change is made to a room lamp illumination mode in which a first illumination light comes from the room lamp section, and also when the vanity mirror section is in use, the first light source section is turned on, and a mode change is made to a vanity mirror illumination mode in which a second illumination light comes from the room lamp section.

In the aspect of the invention, a light coming from the room lamp section creates two illumination modes, i.e., a general room lamp illumination mode with illumination with a light from the room lamp section, and a vanity mirror illumination mode with illumination using a vanity mirror. As such, the resulting illumination device can be excellent in practicality with the smaller size, and can allow color rendering by the light.

DESCRIPTION OF THE PREFERRED EMBODIMENTS

An in-vehicle illumination device of the invention (hereinafter, simply referred to as "illumination device") is provided with a room lamp section and a vanity mirror section. The room lamp section serves to generate an illumination light for illumination of the relatively large and wide area in a vehicle. In the invention, the room lamp section is of a configuration that a first light source section is combined with a light guide plate. The first light source section is so disposed that the light-emitting side thereof is opposed to the end surface of the light guide plate. With such a configuration, a light from the first light source section is directed to the light guide plate from the end surface thereof, and the light is then converted by the light guide plate into a surface light. In the embodiment of the invention, the front surface of the light guide plate serves as a light-emitting surface.

The light source configuring the first light source section is not specifically restricted by type, e.g., the light source can be an LED (Light-Emitting Diode) lamp, a bulb, and others. Among such possibilities, the LED lamp is considered to be most preferable. This is because the LED lamp is small in size, and using the LED lamp thus can contribute to the size reduction of the resulting illumination device. The LED lamp generates a small amount of heat, and this thus leads to the advantages of being able to reduce the influence of heat over other components therearound. The LED lamp also has the advantages of being low in driving power, and being long in life. Such an LED lamp is not specifically restricted by type, and may vary in type for use, e.g., cannonball type and chip type.

The first light source section includes two or more light sources varying in color of light emission. Such a characteristic configuration can implement various illumination states. For example, changing the illumination light depending on the application will be able to increase the effect of illumination, and allow effect production by the light, for example.

The light sources are not specifically restricted by color of light emission. As an example, using together two light sources varying in color of light emission can generate an illumination light of various color tones as a result of mixture of two colors. Using together three light sources varying in color of light emission will offer a wider possible range of variations of color tone. Using three light sources is also considered advantageous to generate a light with a high color rendering quality, e.g., using together three light sources of red, green, and blue will lead to an illumination light of various many colors.

Exemplified here is a case when one of the light sources is of any color, and when the other light source is of white color. If such light sources are subjected to turn-on control, i.e., the former light source is so turned on that the luminance intensity thereof is gradually increased, and the latter light source is so turned on that the luminance intensity thereof is gradually increased with a delay from the turning-on of the former light source, the resulting illumination state shows that an illumination light of any color is gradually increased in brightness, and then is gradually changed in color tone. If the light source of any color emits a light of amber, for example, the change of light will be like at sunrise, i.e., the reddish atmosphere like the sky with sunrise glow will change to the whitish atmosphere like during daytime.

If the light source of white color is so turned off that the luminance intensity thereof is gradually decreased, and if the light source of any color is so turned off that the luminance intensity thereof is gradually decreased with a delay from the turning-off of the light source of white color, the resulting illumination state shows that an illumination light is gradually decreased in illuminance, and then is gradually increased in color tone. If the light source of any color emits a light of amber, for example, the change of light will be like at sunset, i.e., the whitish atmosphere like during daytime will change to the reddish atmosphere like the sky with sunset glow.

The number of the light sources for use to configure the first light source section has no specific upper limit, but is exemplified as being 20 to 50. Note here that the number of the light sources configuring the first light source section can be determined in comprehensive consideration of the luminance intensity thereof, the illuminance required for each application, and others.

The light guide plate is not specifically restricted by material as long as the material is light transmissive. Preferably, the light guide plate is made of a transparent material. The light guide plate is also preferably made of a material that is easy to process and has excellent durability. The possible material for the light guide plate specifically includes polycarbonate resin, acrylic resin (e.g., methacrylate resin, (PMMA)), epoxy resin, glass, and others. The light guide plate can be processed by well-known injection molding, for example.

For the purpose of enabling light radiation with good efficiency from the front surface of the light guide plate, it is preferable to form a light reflection layer to an end surface that is not serving as the light guide section. Alternatively, to derive the similar effects, any other member having the light reflecting surface, e.g., a case made of white resin, may be disposed closely to the end surface not serving as the light guide section.

The illumination device of the invention is provided with a switch for the room lamp section, i.e., first switch, but the switch is not specifically restricted by model and configuration, for example, and may include a tact switch, a capacitance switch, a slide switch, a push switch, a rubber switch, and others.

In the illumination device of the invention, when the first light source section is turned on through operation of the first switch, a mode change is made to a room lamp illumination mode in which a first illumination light comes from the room lamp section. On the other hand, also when the vanity mirror section is in use, the first light source section is turned on, and a mode change is made to a vanity mirror illumination mode in which a second illumination light comes from the room lamp section. As such, the illumination light will change depending on the application, thereby increasing the effect of illumination, e.g., the illumination light at the time of the room lamp illumination mode is in a range of daylight color to bulb's color, and the illumination light at the time of the vanity mirror illumination mode is in a range of daylight color to warm-white color. Preferably, the former is in a range of white color to bulb's color, and the latter is in a range of daylight color to white color. This is an example when the room lamp illumination mode and the vanity mirror illumination mode are both implemented by an illumination light of whitish color. Alternatively, the illumination light in either the vanity mirror illumination mode or the room lamp illumination mode, or the illumination light in the both modes may of any color other than being whitish.

Preferably, the illumination light in the vanity mirror illumination mode, i.e., second illumination light, is with a high color rendering quality than the illumination light in the room lamp illumination mode, i.e., first illumination light (a second configuration of the invention). This is because the color of any illumination target, e.g., color of passenger's(s') face(s), skin, makeup, cloths or others will look more bright with the better shadow effect. This is also suitable for reproducing the colors of the illumination targets with high fidelity. This embodiment is exemplified as below.

1. The first light source section includes a light source of a specific color of light emission, and another light source of a different color of light emission. The light source of a specific color of light emission is turned on in the room lamp illumination mode, and both of the light sources are turned on in the vanity mirror illumination mode.

2. The first light source section includes a light source with a low color rendering quality, and another light source with a high color rendering quality, i.e., light source with wavelength components larger in amount than the light source with a low color rendering quality. The light source with a low color rendering quality is turned on in the room lamp illumination mode, and the remaining light source is turned on in the vanity mirror illumination mode. As an example, the "light source with a low color rendering quality" may be a light source showing a light-emission peak in blue and yellow regions, and the "light source with a high color rendering quality" may be a light source showing a light-emission peak not only in the blue and yellow regions but also in any other color regions, e.g., red, green, and/or amber region.

Note here that a light with a high color rendering quality generally includes therein a larger amount of wavelength components. For example, a light being a combination result of lights from various lamps, e.g., a light from a white LED lamp (e.g., a combination of a blue LED and a yellow fluorescent substance), a light from a green LED lamp, and a light from a red LED lamp, will have a color rendering quality higher than the light from the white LED lamp. Similarly, a light being a combination result of a light from a white LED lamp and a light from an amber LED lamp will have a color rendering quality higher than the light from the white LED lamp or the light from the amber LED lamp.

The turn-on control can be performed alternatively or additionally to the color rendering quality of an illumination light, i.e., the illuminance is to be changed depending on the mode. As an exemplary setting, the illumination light is so set as to be lower in illuminance in the vanity mirror illumination mode than in the room lamp illumination mode (a third configuration of the invention).

In an embodiment, a switch for the vanity mirror section, i.e., third switch, is provided, and when the vanity mirror section is in use, this third switch is operated so that the first light source section is turned on. As such, in such an embodiment, when the first light source section is put in the turn-on state through operation of the third switch, it is "when the vanity mirror section is in use".

In another embodiment, the vanity mirror section is provided not only with the mirror but also with an open/close lid. When the first light source section is under turn-on control through operation of the first switch, and also when the lid is in an open state in response to turn-on control associated with an open/close operation of the lid, a mode change is made to the vanity mirror illumination mode, i.e., a fourth configuration of the invention. With such a configuration, the vanity mirror is automatically illuminated when it is put in use so that the customer convenience can be accordingly improved. Note that, in such an embodiment, when the lid of the vanity mirror section is in the open state, it is "when the vanity mirror section is in use".

A fifth configuration of the invention further includes a map lamp section, and a switch for use by the map lamp section (second switch). In this configuration, the map lamp section is also integrally provided, thereby achieving more versatility and improving the customer convenience. The map lamp section is provided with a second light source section, and a lens that converges a light from the second light source section. The lens is disposed in front of the second light source section, and the light from the second light source section is radiated to the outside after being converged by the lens. The map lamp section serves to generate an illumination light for illumination of the relatively small and narrow area in the vehicle, e.g., the area where the driver's and/or passenger's(s') hands are placed.

Similarly to the first light source section, the light sources configuring the second light source section are not specifically restricted by type. Note that, also in this case, the LED lamp is considered to be most preferable. Similarly to the first light source section, the light sources of the second light source section are not specifically restricted by color of light emission. Moreover, the number of the light sources for use to configure the second light source section is not also specifically restricted, but is exemplified as being 1 to 4.

A sixth configuration of the invention has characteristics that, when both the room lamp section and the map lamp section are being in the turn-on state (such a state is hereinafter referred to as "simultaneous illumination mode"), the illuminance of an illumination light coming from the room lamp section is lower than the illuminance of an illumination light coming from the room lamp section when only the room lamp section is being in the turn-on state. Herein, there is a concern that the power consumption may be maximized in the simultaneous illumination mode, and the amount of heat generation is also maximized associated therewith. However, with the configuration of decreasing the illuminance in the simultaneous illumination mode as such, the maximum amount of heat generation in the resulting illumination device can be reduced in value so that the heat sink member can be accordingly reduced in size.

In a seventh configuration of the invention, the light guide plate is so shaped that the side of an end surface thereof is partially notched, and the map lamp section is at least partially located inside of the resulting notch. Such a configuration achieves further size reduction. The notch is not specifically restricted by shape, but for the purpose of achieving improvement in terms of design, the light guide plate may be designed in consideration of the degree of integrity between the room lamp section and the map lamp section. The notch is also not specifically restricted by size, but the too-large notch may impair the design quality, and prevent the light-emission area from being large enough. On the other hand, the too-small notch may prevent the space from being reserved for the map lamp. In consideration thereof, the notch may be so formed as to occupy $1/100$ to $1/10$, preferably $1/60$ to $1/30$, of the remaining portion of the end surface of the light guide plate.

In an eighth configuration of the invention, the switch for the room lamp, i.e., first switch, and the switch for the map lamp, i.e., second switch, are disposed in front of the light guide plate. That is, these switches are so disposed as to overlay the light guide plate in planar view. This favorably achieves further size reduction, and improves the degree of integrity between the switches and the room lamp section, thereby improving also the design quality.

In a ninth configuration of the invention, the light sources respectively configuring the first and second light source sections are mounted to the same heat sink member, i.e., a single piece of heat sink member carries thereon all of the light sources. The light sources are mounted to the heat sink member directly or indirectly via any other member. If with direct mounting, the heat sink member for use serves also as the mounting substrate, and if with indirect mounting, the light sources are mounted to the heat sink member via the mounting substrate. For more details, refer to an example that will be described below.

In the below, the invention is described in more detail by referring to the accompanying drawings.

Figure 1:
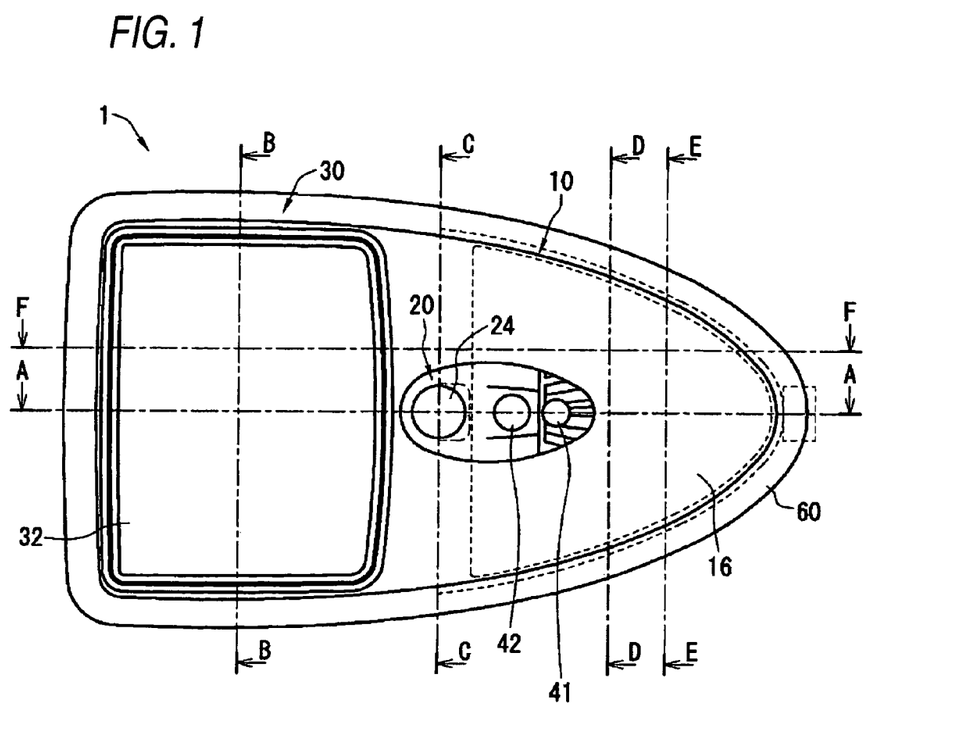
FIG. 1 is a front view of an illumination device 1 in an example.
Figure 2:
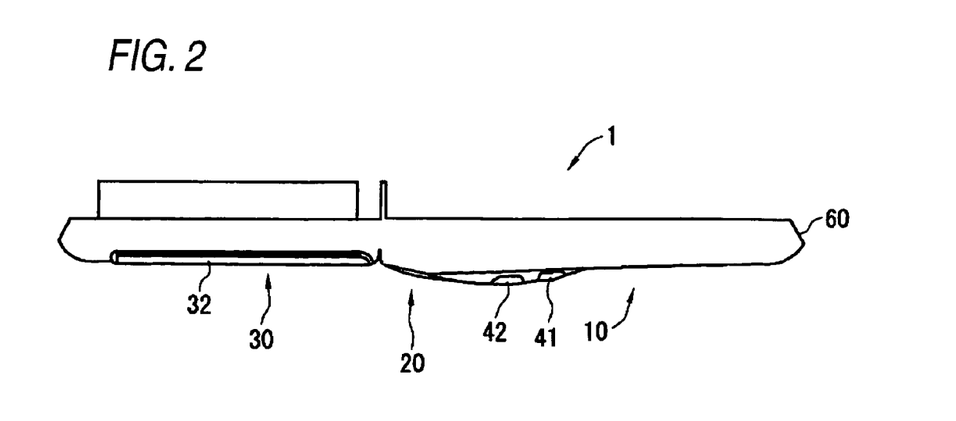
FIG. 2 is a side view of the illumination device 1.
Figure 3:
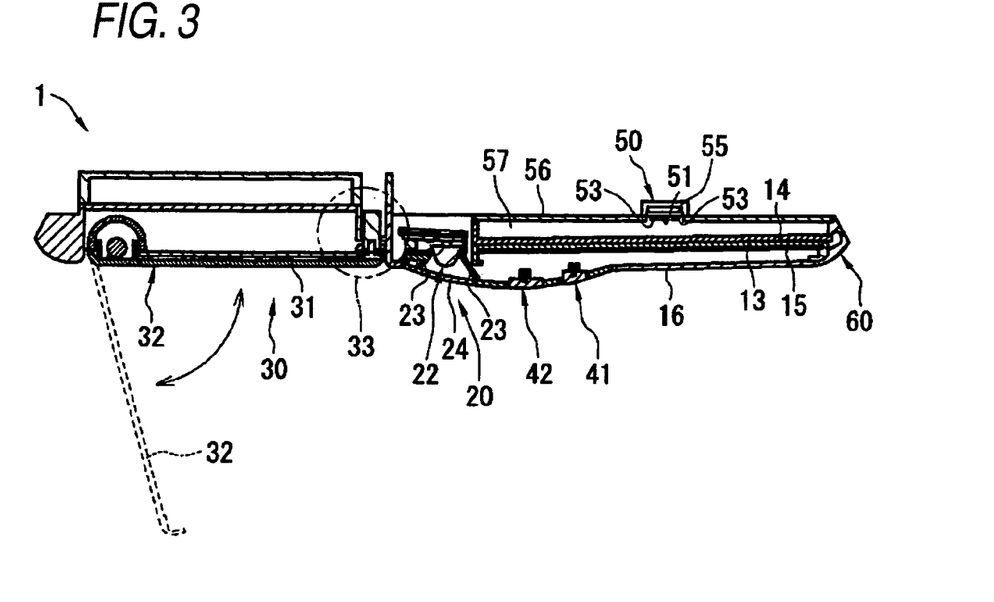
FIG. 3 is a cross sectional view of the illumination device 1 of FIG. 1 cut along a line A-A.
Figure 4:
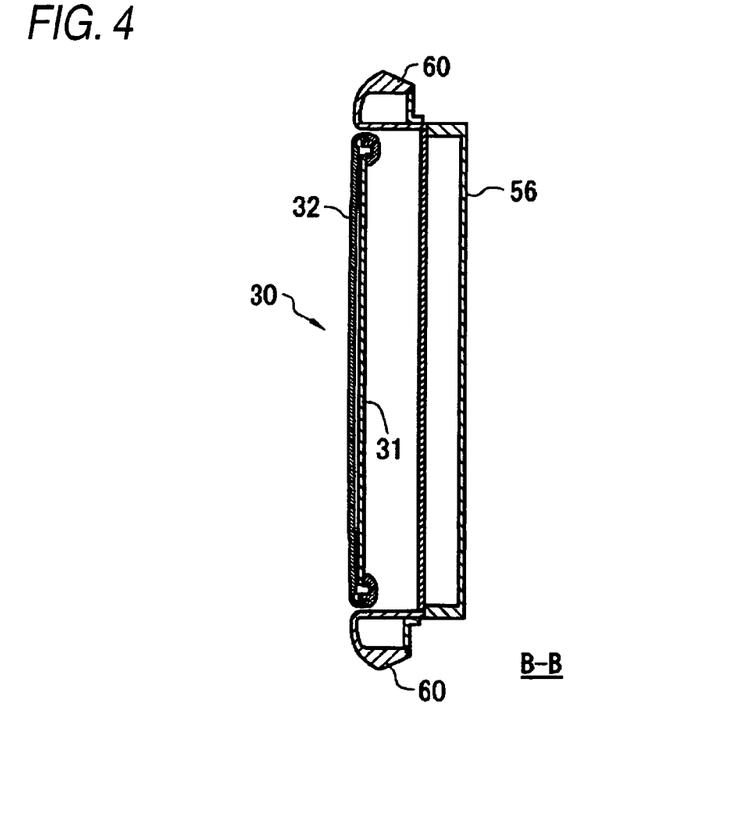
FIG. 4 is another cross sectional view of the illumination device 1 of FIG. 1 cut along a line B-B.
Figure 5:
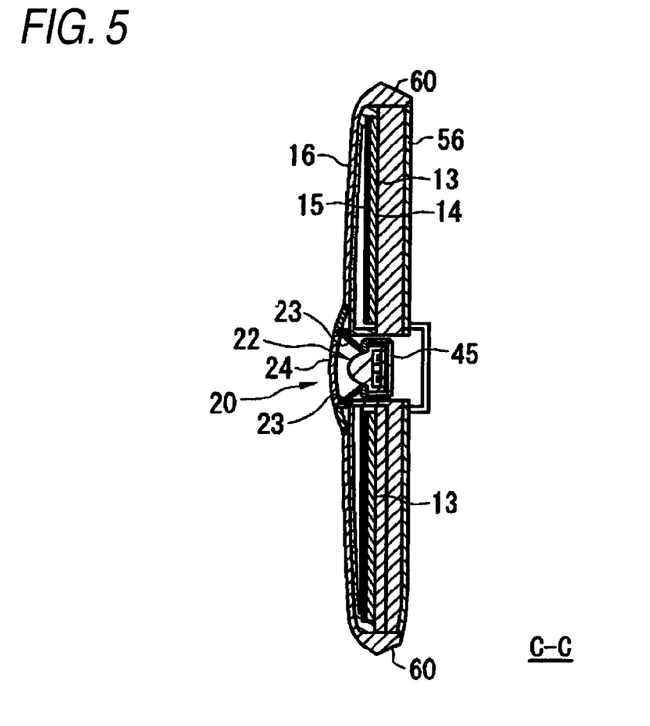
FIG. 5 is still another cross sectional view of the illumination device 1 cut along a line C-C.
Figure 6:
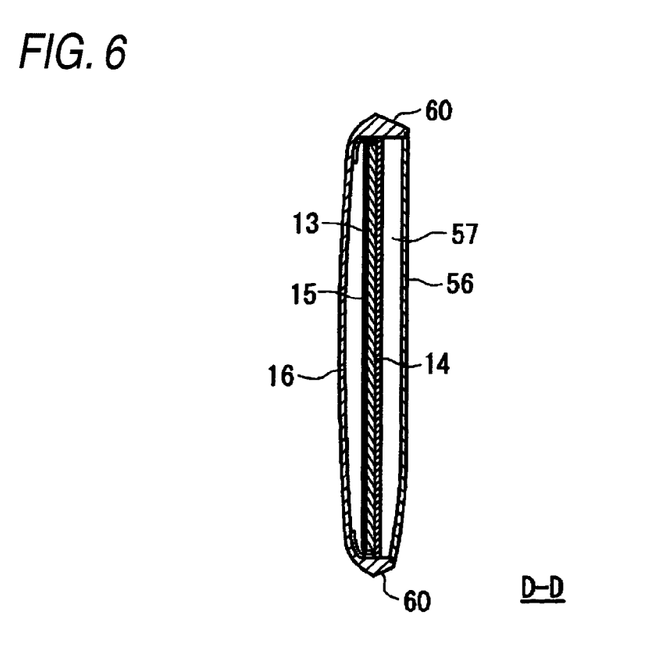
FIG. 6 is still another cross sectional view of the illumination device 1 cut along a line D-D.
Figure 7:
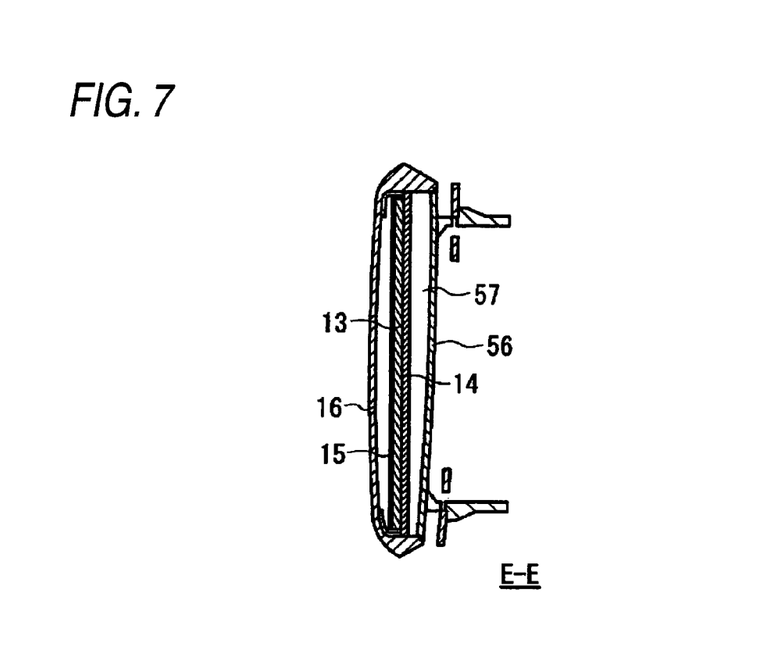
FIG. 7 is still another cross sectional view of the illumination device 1 cut along a line E-E.
Figure 8:
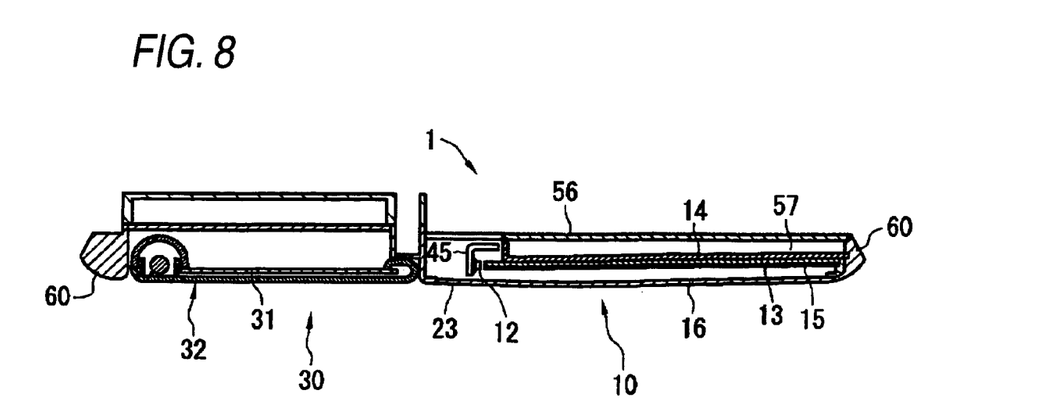
FIG. 8 is still another cross sectional view of the illumination device 1 cut along a line F-F.
Figure 9:
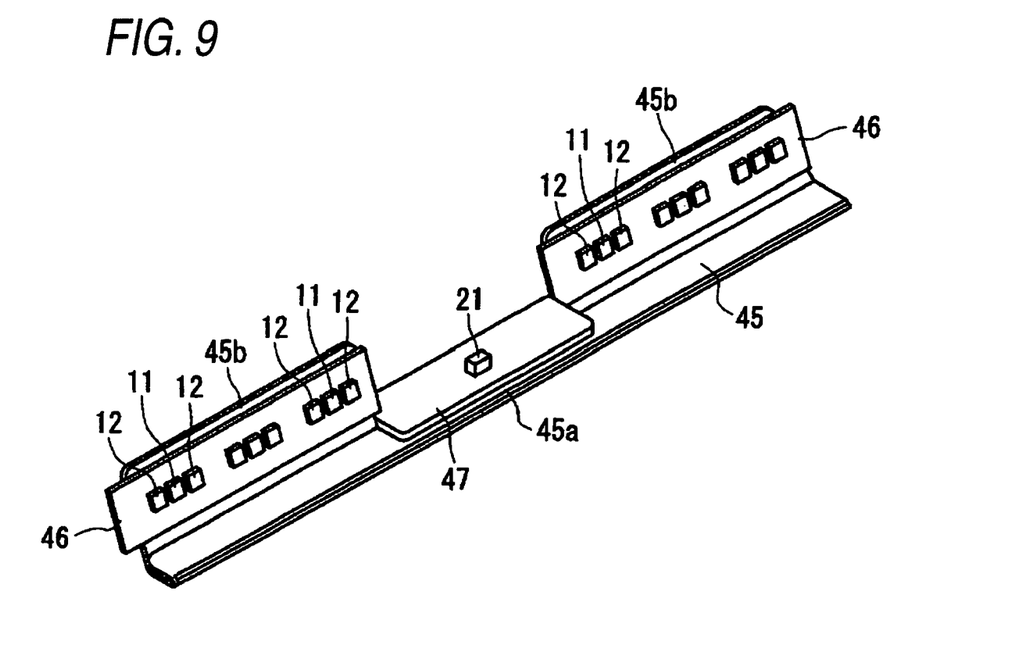
FIG. 9 is a perspective view of a room lamp section and that of a map lamp section, respectively showing the light source configuration thereof.
Figure 10:
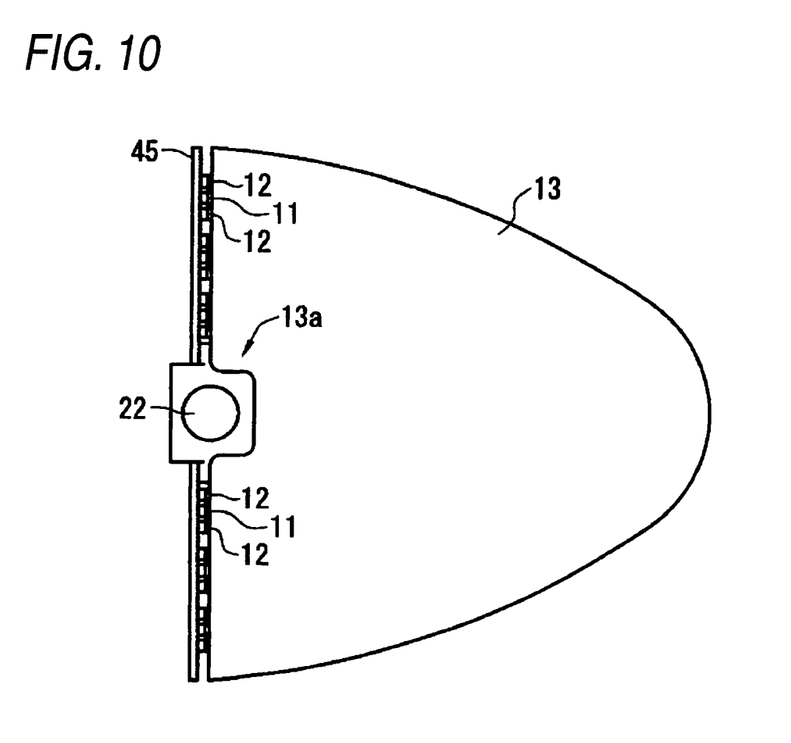
FIG. 10 is a plan view showing the configuration of the room lamp section, and the layout of the map lamp section.
Figure 11:
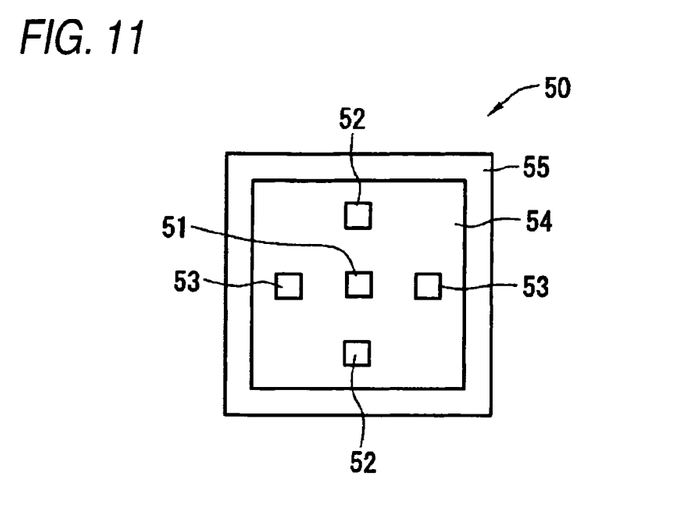
FIG. 11 is a plan view of an indirect illumination light source section, showing the configuration thereof.

FIGS. 1 to 11 each show an illumination device 1 in an example of the invention. FIG. 1 is a front view of the illumination device 1, FIG. 2 is a side view thereof, FIG. 3 is a cross sectional view thereof cut along a line A-A of FIG. 1, FIG. 4 is another cross sectional view thereof cut along a line B-B of FIG. 1, FIG. 5 is still another cross sectional view thereof cut along a line C-C of FIG. 1, FIG. 6 is still another cross sectional view thereof cut along a line D-D of FIG. 1, FIG. 7 is still another cross sectional view thereof cut along a line E-E of FIG. 1, and FIG. 8 is still another cross sectional view thereof cut along a line F-F of FIG. 1. FIG. 9 is a perspective view of a room lamp section and that of a map lamp section, respectively showing the light source configuration thereof, FIG. 10 is a plan view showing the configuration of the room lamp section, and the layout of the map lamp section, and FIG. 11 is a plan view of an indirect illumination light source section, showing the configuration thereof.

The illumination device 1 is configured to include a room lamp section 10, a map lamp section 20, a vanity mirror section 30, switches 41 and 42, an indirect illumination light source section 50, and a design case 60. In the illumination device 1, as shown in FIG. 9, a single piece of heat sink plate 45 characteristically carries thereon LED lamps 11 and 12 for use by the room lamp section, and LED lamp 21 for use by the map lamp section. Such shared use of the heat sink plate is aimed to reduce the size and weight of the resulting heat sink member in the entire illumination device. The reduction of the number of components is also aimed.

The heat sink plate 45 is made of aluminum, and is in a linear shape substantially like a letter L (like a bar) except a center portion 45a. As to the heat sink plate 45, right and left wing portions 45b and 45b are each provided thereon with the LED lamps 11 and 12 for use by the room lamp section via a mounting substrate 46, and similarly via a mounting substrate 47, the center portion 45a is provided thereon with the LED lamp 21 for use by the map lamp section. For coupling between the mounting substrates and the heat sink plate 45, an adhesive heat conductive sheet is used. Using such a heat conductive sheet allows heat dissipation with good efficiency from each of the mounting substrates to the heat sink plate 45. Moreover, the mounting substrates are each made of aluminum, thereby improving the efficiency of heat dissipation.

For use by the room lamp section, as shown in the drawing, the mounting substrate 46 is mounted with nine LED lamps in total. Every three of these nine LED lamps form a cluster. Each of the clusters is configured to include the SMD (Surface Mounted Device)-type LED lamp 11 of white (hereinafter, referred to as "white LED lamp"), and the two SMD-type LED lamps 12 of amber (hereinafter, referred to as "amber LED lamps"). The white LED lamp 11 is disposed at the center of the cluster, and the amber LED lamps 12 are disposed right and left sides of the white LED lamp 11. The white LED lamp is of a configuration in which a blue LED is combined with a YAG (Yttrium Aluminum Garnet) fluorescent substance, for example. The mounting substrates are each formed thereon with a control circuit for control over the LED lamps mounted thereon (not shown).

As described above, the two types of LED lamps 11 and 12 varying in color of light emission are provided for use by the room lamp section. This accordingly implements the various many illumination states, thereby allowing effect production by light, e.g., fade-in effect and fade-out effect, selection of illumination light in accordance with applications, and others.

For the map lamp section 20, one LED lamp 21 is used. The LED lamp 21 is an SMD-type white LED lamp, which emits white lights in combination of a blue LED and a YAG fluorescent substance, for example.

The room lamp section 10 is provided therein with a light guide plate 13 (FIGS. 3, 5 to 8, and 10). The light guide plate 13 looks substantially like a rectangle in planar view, and a part thereof is notched along the outside shape of the map lamp section 20 (reference numeral 13a of FIG. 10). As shown in FIGS. 8 and 10, on the end surface of the light guide plate 13, the white LED lamp 11 is opposed to the amber LED lamps 12 in proximity to each other. The rear surface side of the light guide plate 13 is provided with a reflection sheet 14 with close contact to the light guide plate 13. On the other hand, the front surface side of the light guide plate 13 is affixed thereon with a diffusion film 15.

In front of the light guide plate 13, an outer lens 16 is disposed, and a light coming from the front surface of the light guide plate 13 goes through the outer lens 16 for radiation to the outside. The outer lens 16 is made of transparent resin, and the inner surface thereof is grained.

The map lamp section 20 is formed therein with a lens 22 (FIG. 3). The lens 22 is a convex lens, and is so disposed as to cover the LED lamp 21. A bowl-shaped reflector 23 is so provided as to surround the lens surface of the lens 22 (FIGS. 3 and 5). In front of the lens 22, an outer lens 24 is disposed, and a light coming from the lens 22 goes through the outer lens 24 for radiation to the outside. The light coming from the LED lamp 21 is converged when it goes through the lens 22, and the resulting light becomes narrow in directional angle. As such, thus generated light illuminates any limited portion of area, i.e., like spotlight. The outer lens 24 looks substantially like a circle in planar view. The outer lens 24 is made of transparent resin, and the inner surface thereof is grained. The edge portion of the outer lens 24 comes in contact with the edge portion of the reflector 23.

As shown in FIGS. 1 and 10, the map lamp section 20 is partially located inside of the notch 13a formed to the light guide plate 13. Such a layout successfully achieves the size reduction, and favorably increases the degree of integrity between the room lamp section 10 and the map lamp section 20, thereby improving the design quality.

The vanity mirror section 30 is configured to include a vanity mirror 31, and a cover 32. The cover 32 is provided with a push-and-open open/close mechanism 33 so that the vanity mirror section 30 becomes able to be freely opened and closed through manual operation. Note here that the vanity mirror section 30 is provided with means for detecting whether or not the cover 32 is in the open state (not shown). With such detection means, as will be described later, the turn-on control is performed in response to opening and closing of the cover 32.

The switches 41 and 44 are each a capacitance switch. These switches are each connected with a capacitance sensor (not shown) via a harness (not shown). In the illumination device 1, the switch 41 serves as an ON/OFF switch for the room lamp section 10, and the switch 42 serves as an ON/OFF switch for the map lamp section 20.

In the illumination device 1, the switches 41 and 42 are characteristically disposed in front of the light guide plate 13. Such a layout thus achieves size reduction of the illumination device 1. In view of design quality, the degree of integrity is improved among the switches 41 and 44, the room lamp section 10, and the map lamp section 20 so that the resulting illumination device gives the impression of sophistication.

The number of the switches may be increased or decreased. As an example, the room lamp section 10 may be turned on by one switch, and may be turned off by another switch. Alternatively, a switch may be provided for a mode change between an "illumination mode associated with opening and closing of a door(s)" and an "illumination mode not associated with opening and closing of the door(s)". Note that, in this example, a mode setting is made to the "illumination mode associated with opening and closing of the door(s)", and the room lamp section also performs illumination in response to opening and closing of the door(s) (the details will be left for later description).

As shown in FIG. 11, the indirect illumination light source section 50 uses five LED lamps in total. An LED lamp 51 at the center is an SMD-type white LED lamp. In such a manner as to surround this white LED lamp, amber LED lamps 52 and blue LED lamps 53 are disposed alternately at regular intervals. By using the LED lamps varying in color of light emission as such, the resulting indirect illumination light source section becomes able to generate lights of various colors. Reference numerals 54 and 55 respectively denote a mounting substrate and a heat sink plate.

Herein, a reference numeral 56 in FIG. 3 denotes a chassis made of white resin, and in a concave portion partially formed thereto, the indirect illumination light source section 50 is disposed.

A design cover 60 is made of transparent resin, and the surface thereof has been subjected to blasting.

Figure 12:
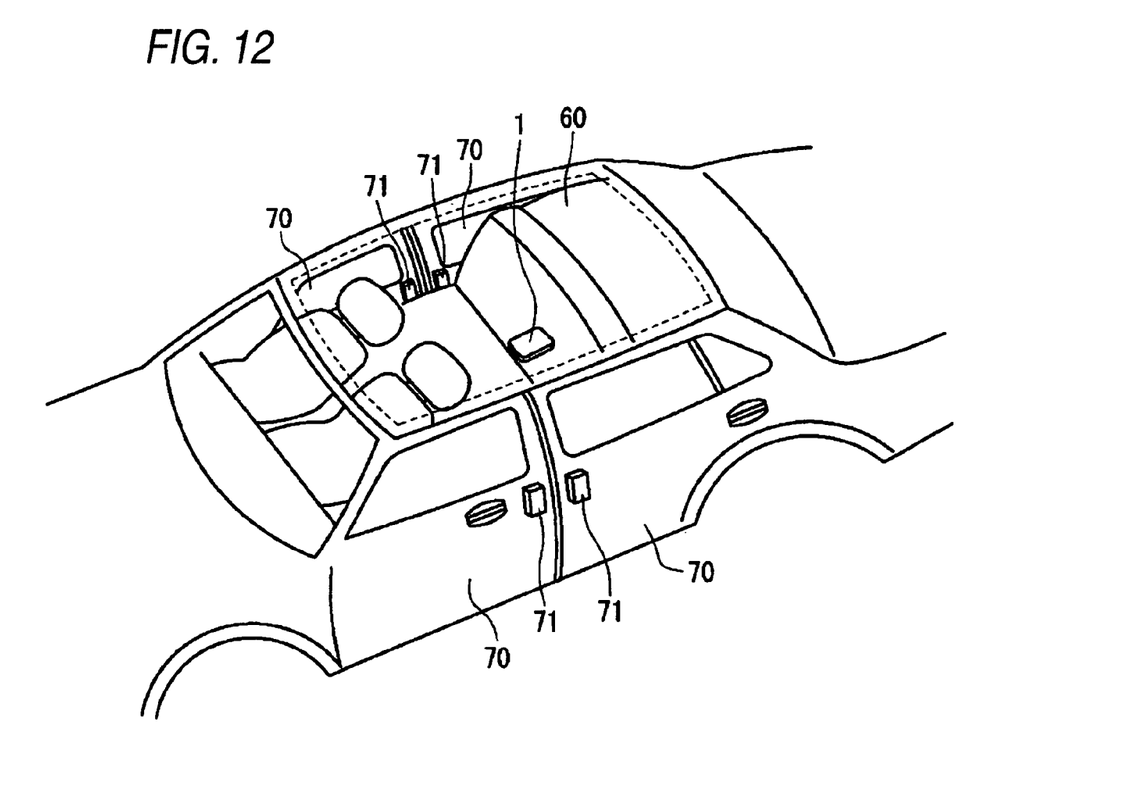
FIG. 12 is a diagram showing the placement position of the illumination device 1.
Figure 13:
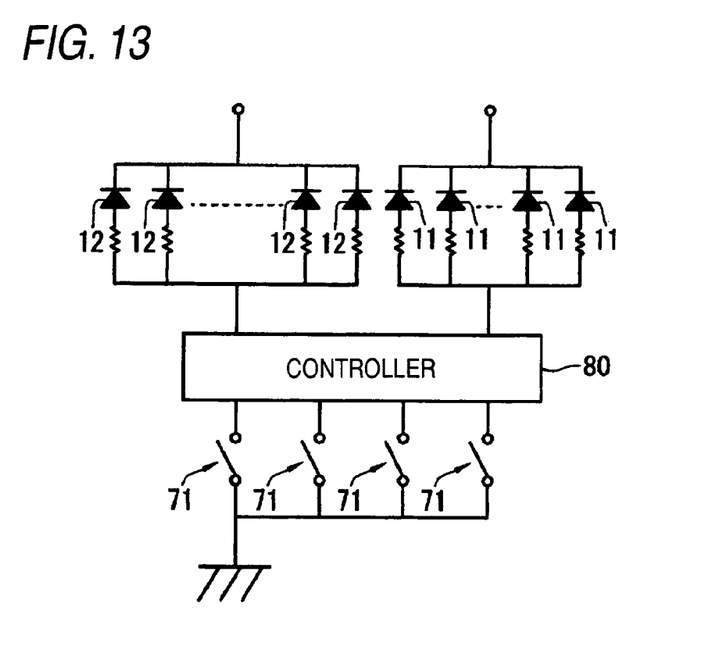
FIG. 13 is a schematic view of the illumination device 1, showing a turn-on control circuit of the room lamp section thereof.

As shown in FIG. 12, the illumination device 1 is disposed to the roof, i.e., ceiling portion, inside of a vehicle. FIG. 12 shows an exemplary case where one illumination device 1 is used for use by passengers in the rear seats.

Described next is the illumination state of the illumination device 1 by referring to FIGS. 3, 8, and 12 to 14. First of all, when sidelights of a vehicle are turned on, in synchronization therewith, the indirect illumination light source section 50 is put in the turn-on state in accordance a predetermined rule, e.g., the white LED lamp 51 and the amber LED lamps 52 are turned on. Alternatively, an external controller may be separately provided, and the turn-on state of the indirect illumination light source section 50 may be arbitrarily changed thereby.

A light coming from the indirect illumination light source section 50 is propagated inside of a space 57 enclosed by a chassis 56 while being reflected and diffused on the surface of the chassis 56 (FIGS. 3 and 8). The light eventually goes through the design cover 60, and is extracted to the outside. In this manner, the surface of the design cover 60 glows so that the color rendering is performed with the light.

The room lamp section 10 is put in the turn-on state when the switch 41 is depressed. At this time, in the room lamp section 10, all of the amber LED lamps 12 are turned on. A light coming from each of these LED lamps 12 are captured by the light guide plate 13, and then are guided inside thereof. As a result of the reflection by the reflection sheet 14, the lights of amber are emitted from the front surface of the light guide plate 13. The lights are then diffused by a diffusion sheet 15 and the outer lens 16 before radiation to the outside. As a result, the lights of amber illuminate inside of the vehicle, i.e., room lamp illumination. If the switch 41 is depressed when the room lamp section 10 is being in the turn-on state, the room lamp section 10 is put into the turn-off state.

On the other hand, as will be described below, the illumination device 1 also performs illumination associated with opening and closing of a door(s) 70. As shown in FIG. 12, the doors 70 are each provided with a door switch 71 serving to detect the open/close state of the door, and are each turned ON when the door 70 is in the open state. These door switches 71 are electrically connected to a controller 80 (refer to FIG. 13). The controller 80 controls the turn-on state of the lamps in the room lamp section 10, i.e., the white LED lamps 11 and the amber LED lamps 12, in accordance with an input signal of each of the door switches 71.

Figure 14:
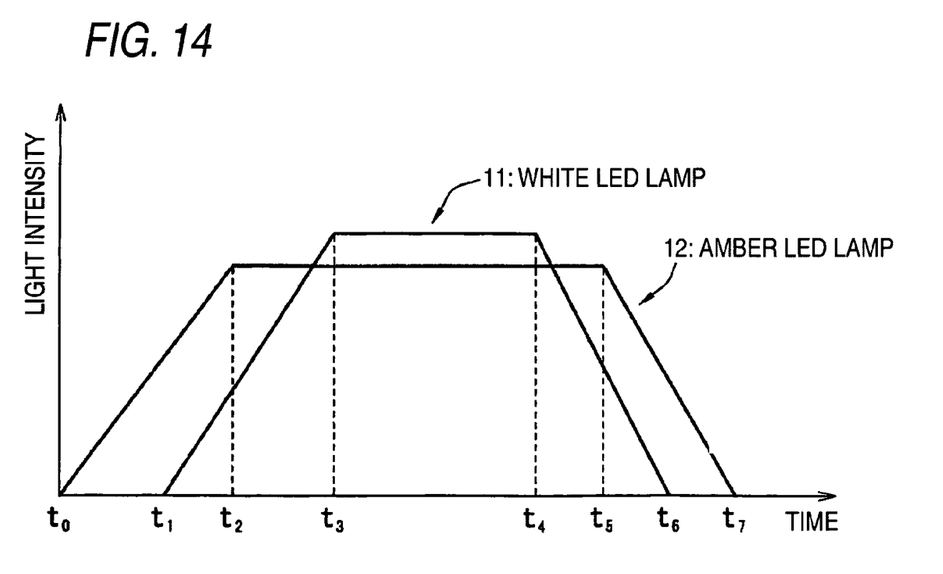
FIG. 14 shows exemplary turn-on control over the illumination device 1.

FIG. 14 is a graph schematically showing the state of turn-on control over the LED lamps by the controller 80. As shown in this graph, when any of the doors 70 is opened, first of all, the amber LED lamps 12 are started to be turned on. The amber LED lamps 12 are so turned on that the luminance intensity thereof shows a gradual increase until the lapse of a predetermined length of time (t2) after the start of the turning-on (t0). Thereafter, the luminance intensity thereof is kept at a constant level. On the other hand, with the lapse of a predetermined length of time (t1) after the start of the turning-on of the amber LED lamps 12 (t0), the white LED lamps 11 are started to be turned on. The luminance intensity of the white LED lamps 11 shows a gradual increase until the lapse of a predetermined length of time (t3). Thereafter, the luminance intensity of the white LED lamps is kept at a constant level. Through such control at the time of turning on the lamps, for a predetermined length of time (t0 to t1) after the start of the turning-on of the amber LED lamps 12 (t0), the inside of the vehicle is illuminated in color of amber only by the lights from the amber LED lamps 12, and the illuminance thereof shows a gradual increase with the lapse of time. After the lapse of the predetermined length of time (t1), the lights from the white LED lamps 11 start to be blended in color, and until the predetermined length of time comes (t2), the illuminance thereof shows a gradual increase. As such, the illumination lights show a gradual increase of color tone from the time (t1) to the time (t2), and at the same time, the illuminance thereof shows an increase. After the lapse of the predetermined length of time (t2), the luminance intensity of the amber LED lamps 12 is kept at a constant level, and only the luminance intensity of the white LED lamps 11 shows a gradual increase. As such, the illumination lights show an increase of illuminance, and the proportion of the white lights in the entire illumination lights is increased so that the illumination lights are increased in color tone, i.e., changed to be whitish.

As described above, the amber LED lamps 12 and the white LED lamps 11 are so illuminated as to be each faded in, and these LED lamps are turned on at different timings. This accordingly leads to the illumination state showing a high color rendering effect with well-designed change of illuminance and color tone. It thus is possible to represent a change of lights just like at the time of sunrise, i.e., a change of atmosphere from being reddish like the sky with sunrise glow to being whitish like during daytime.

On the other hand, if with a state change of the doors 70, i.e., from the state in which any of the doors 70 is opened to the state in which all of the doors 70 are closed, the controller 80 performs turn-off control. That is, after detecting that every door switch 71 is in the OFF state, first of all, the controller 80 starts to turn off the white LED lamps 11. The white LED lamps 11 are so turned off that the luminance intensity thereof shows a gradual decrease for a predetermined length of time (t4 to t6) after the start of the turning-off (t4). On the other hand, after the lapse of a predetermined length of time (t5 to t4) after the start of the turning-off of the white LED lamps 11 (t4), the amber LED lamps 12 are started to be turned off. The amber LED lamps 12 are also so turned off that the luminance intensity thereof shows a gradual decrease until the lapse of a predetermined length of time (t5 to t7) after the start of the turning-off thereof (t5).

Through control at the time of lamp turning off as such, for a predetermined length of time (t4 to t5) after the start of the turning-off of the white LED lamps 11, the luminance intensity of the illumination lights show a gradual decrease due to the decrease of the luminance intensity only of the white LED lamps 11, and the proportion of the white lights in the entire illumination lights is decreased so that the illumination lights are decreased in color tone, i.e., become dark (dense). After the lapse of the time (t5), the lights from the amber LED lamps 12 also start to be reduced, and until the time comes (t6), the luminance intensity of these LED lamps shows a gradual decrease. As such, the illumination lights show a gradual decrease of color tone from the time (t5) to the time (t6), and at the same time, the illuminance thereof shows a decrease. After the lapse of the time (t6), illumination is performed only by the lights from the amber LED lamps 12, and the luminance intensity thereof shows a gradual decrease with a lapse of time. As such, the illumination lights of amber dim out with a gradual decrease of illuminance.

As described above, the white LED lamps 11 and the amber LED lamps 12 are so turned off as to be each faded out, and the white LED lamps 11 and the amber LED lamps 12 are turned off at different timings. This accordingly leads to the illumination state showing a high color rendering effect with well-designed change of illuminance and color tone. It thus is possible to represent a change of lights just like at the time of sunset, i.e., a change of atmosphere from being whitish like during daytime to being reddish like the sky with sunset glow, and then being dimmed out like at nighttime.

In the above example, for control at the time of turning on the lamps, the amber LED lamps 12 are firstly turned on. This is surely not restrictive, and alternatively, the LED lamps may be controlled in terms of turn-on state in such a manner that the white LED lamps 11 may be turned on first. Similarly, for control at the time of turning off the lamps, the LED lamps may be controlled in terms of turn-off state in such a manner that the amber LED lamps 12 may be turned off first.

For control at the time of turning on the lamps, still alternatively, the white LED lamps 11 and the amber LED lamps 12 may be started to be turned on all at once, and these lamps may be differently changed in luminance intensity. Similarly, for control at the time of turning off the lamps, the white LED lamps 11 and the amber LED lamps 12 may be started to be turned off all at once, and these lamps may be differently changed in luminance intensity.

The state of luminance intensity change at the time of turning-on or -off of the LED lamps is not specifically restrictive to the above, and the luminance intensity change can be made in various manners other than the linear luminance intensity change of FIG. 14, e.g., increase (decrease) of luminance intensity exponentially or in stages.

Also when the room lamp section 10 is put in the turn-on state through operation of the switch 41, as described above, the white LED lamps 11 and the amber LED lamps 12 may be turned on at different timings, and these LED lamps may be so controlled that the luminance intensity thereof shows a gradual increase in the early stage after being turned on. If this is the case, the color rendering effect will be produced similarly to the illumination in response to opening and closing of the door(s). This is also applicable to a case where the room lamp section 10 is put in the turn-off state through operation of the switch 41.

Described next is the illumination state of the map lamp section 20. First of all, when the map lamp section 20 is put in the turn-on state through operation of the switch 42, a white light comes from the LED lamp 21 in the map lamp section. The light coming from the LED lamp 21 as such goes through the lens 22 located in the front, and then is converged. The resulting light becomes narrow in directional angle, and then is radiated toward the outside via the outer lens 24. As a result, the area where the passenger's(s') hands are placed is illuminated by such a white light like a spotlight. Note that the light coming from the lens 22 is partially reflected by the reflector 23, and then are radiated toward the outside after passing through the outer lens 24. This reflector 23 serves to align the luminous fluxes, and to improve the luminance intensity.

When the map lamp section 20 is put in the turn-on state through operation of the switch 42 when the room lamp section 10 is in the turn-on state, i.e., simultaneous illumination mode, similarly to the above, the LED lamp 21 in the map lamp section 20 is turned on, and a white illumination light comes from the map lamp section 20. At the same time, the LED lamps in the room lamp section 10 are controlled in terms of turn-on state in such a manner that the luminance intensity thereof becomes about 800% of the maximum. As a result, in comparison with the case where only the room lamp section 10 is turned on, the lights coming from the room lamp section 10 are lower in illuminance. With such a configuration that the illuminance of the illumination lights coming from the room lamp section 10 is suppressed in the simultaneous illumination mode in which the amount of heat generation in the entire device becomes maximum, the maximum amount of heat generation will be smaller in value in the illumination device 1. This accordingly allows the use of a small-sized heat sink plate so that the resulting device can be favorably reduced in weight.

Described next is the illumination state of the vanity mirror section 30. First of all, when the cover 32 of the vanity mirror section 30 is unlocked through operation of a passenger, the white LED lamps 11 in the room lamp section 10 are all put in the turn-on state. Accordingly, white illumination lights come from the room lamp section 10 through the outer lens 15 thereof, i.e., vanity mirror illumination. That is, the resulting illumination is of a color different from the room lamp illumination. As such, in the illumination device 1, the illumination lights are changed in color depending on the application, thereby improving the illumination effect. Note that, when the cover 32 is locked again by pushing it back, the white LED lamps 11 are put in the turn-off state. Such turn-on control in response to opening and closing of the cover 32 is surely not restrictive, and alternatively, turn-on control may be performed using a switch that is additionally provided. Moreover, similarly to the room lamp illumination associated with opening and closing of the door(s) 70, also with the vanity mirror illumination, turn-on control may be performed over the LED lamps so as to derive various types of illumination states showing fade-in effect and fade-out effect, for example.

In the example described above, for the room lamp illumination, the illumination is performed with lights of amber by turning on the amber LED lamps, and for the vanity mirror illumination, the illumination is performed with lights of white by turning on the white LED lamps. The combination of the illumination lights is surely not restrictive thereto, and alternatively, for the former illumination, the white LED lamps or the amber LED lamps may be turned on, and for the latter illumination, the white LED lamps and the amber LED lamps may be turned on, for example. If this is the case, with the vanity mirror illumination, the lights will be with a high color rendering quality being the result of mixing (blending) two colors of lights, i.e., lights of white and amber. Still alternatively, for the former illumination, the white LED lamps and the amber LED lamps may be turned on with their maximum light intensities, and for the latter illumination, the white LED lamps may be illuminated with the maximum luminance intensity, and the amber LED lamps may be turned on with the low luminance intensity, e.g., about 70% of the maximum luminance intensity thereof. Through turn-on control as such, with the room lamp illumination, the illumination is performed with lights of bulb's color, and with the vanity mirror illumination, the illumination is performed with lights of daylight color with a high color rendering quality being suited for reproducing the color of skin and cloths with high fidelity.

In addition to the white LED lamps and the amber LED lamps, if LED lamps of any other color are used, the resulting illumination can be performed with lights of color showing a higher color rending quality. As an example, the LED lamps in use may be of white, amber, green, and red, and for the room lamp illumination, the white or amber LED lamp or both of these may be turned on, and for the vanity mirror illumination, the white, green, and red LED lamps may be turned on. If this is the case, for the vanity mirror illumination, the illumination may be performed with lights of color with a high color rendering quality including red and green components.

Alternatively, the LED lamps in use may be of only three colors, i.e., white, red, and green without amber. If this is the case, for the room lamp illumination, the white LED lamp may be turned on, and for the vanity mirror illumination, all of the LED lamps of white, red, and green may be turned on.

Still alternatively, the LED lamps in use may be of only two colors, i.e., white and red. If this is the case, for the room lamp illumination, the white LED lamp may be turned on, and for the vanity mirror illumination, the LED lamps of white and red may be turned on, for example.

The illumination device of the invention is utilized for illuminating the inside of vehicles.

While the invention has been described in detail, the foregoing description is in all aspects illustrative and not restrictive. It is understood that numerous other modifications and variations can be devised without departing from the scope of the invention.

The contents of the documents, patent applications, patents, and others expressed in this specification are entirely incorporated by reference.

What is claimed is:

1. An in-vehicle illumination device, comprising:
   a room lamp section provided with a first light source section, and a light guide plate that guides a light of the first light source section from an end surface thereof and emits the light from a front surface thereof;
   a first switch for the room lamp section; and
   a vanity mirror section provided with a mirror,
   wherein, when the first light source section is turned on through an operation of the first switch, a mode change is made to a room lamp illumination mode in which a first illumination light comes from the room lamp section, and
   wherein, when the vanity mirror section is in use, the first light source section is turned on, and a mode change is made to a vanity mirror illumination mode in which a second illumination light comes from the room lamp section.

2. The in-vehicle illumination device according to claim 1, wherein the second illumination light has a higher color rendering quality than the first illumination light.

3. The in-vehicle illumination device according to claim 1, wherein the second illumination light is lower in illuminance than the first illumination light.

4. The in-vehicle illumination device according to claim 1, wherein the vanity mirror section is provided with an open/close lid, and a mode change is made to the vanity mirror illumination mode when the first light source section is under a turn-on control through the operation of the first switch, and also when the lid is in an open state in a response to a turn-on control associated with an open/close operation of the lid.

5. The in-vehicle illumination device according to claim 1, further comprising:
   a map lamp section provided with a second light source section, and a lens that converges a light of the second light source section; and
   a second switch for the map lamp section.

6. The in-vehicle illumination device according to claim 5, wherein an illumination light coming from the room lamp section when both the room lamp section and the map lamp section are in a turn-on state is lower in illuminance than an illumination light coming from the room lamp section when only the room lamp section is in the turn-on state.

7. The in-vehicle illumination device according to claim 5, wherein the light guide plate has a shape that a side of the end surface is partially notched, and the map lamp section is at least partially located inside of the notch.

8. The in-vehicle illumination device according to claim 5, wherein the first and second switches are disposed in front of the light guide plate.

9. The in-vehicle illumination device according claim 5, wherein a light source configuring the first light source section and a light source configuring the second light source section are mounted on a same heat sink member.

10. The in-vehicle illumination device according to claim 5, wherein the light source configuring the first light source section and the light source configuring the second light source section each comprise an LED (Light-Emitting Diode) lamp.

11. The in-vehicle illumination device according to claim 1, further comprising:
    a map lamp section provided with a second light source section,
    wherein an illumination light coming from the room lamp section when both the room lamp section and the map lamp section are in a turn-on state is lower in illuminance than an illumination light coming from the room lamp section when only the room lamp section is in the turn-on state.

12. The in-vehicle illumination device according to claim 1, further comprising:
    a map lamp section provided with a second light source section,
    wherein the light guide plate has a shape that a side of the end surface is partially notched, and the map lamp section is at least partially located inside of the notch.

13. The in-vehicle illumination device according to claim 1, further comprising:
    a map lamp section provided with a second light source section,
    wherein, in a plan view, the first switch overlaps with the light guide plate.

14. The in-vehicle illumination device according to claim 1, wherein, in a plan view, the end surface is attached to the front surface.

15. The in-vehicle illumination device according to claim 1, wherein, in a plan view, the end surface abuts the front surface.

16. The in-vehicle illumination device according to claim 1, further comprising:
    a map lamp section provided with a second light source section, one side of the map lamp abutting the room lamp section and an other side of the map lamp abutting the vanity mirror section.

17. The in-vehicle illumination device according to claim 1, wherein in a cross-sectional view, the light guide plate has a shape of a rectangle,
    wherein the end surface forms a width of the rectangle and the front surface forms a length of the rectangle.

18. The in-vehicle illumination device according to claim 1, wherein the vanity mirror section comprises an open/close lid, and
    wherein a color of the light emitted from the front surface of the light guide plate changes with an operation of the open/close lid.

19. An in-vehicle illumination device, comprising:
    a room lamp section, comprising:
        a first light source section; and
        a light guide plate that guides a light of the first light source section from a side surface of the light guide plate and emits the light from a bottom surface of the light guide plate;
    a map lamp section located adjacent to the room lamp section; and
    a vanity comprising a mirror and located adjacent to the map lamp section, wherein, when the first light source section is turned on by a switch thereof, a first illumination light is emitted from the room lamp section, and wherein, when the vanity mirror section is in use, the first light source section is turned on, and a second illumination light, having a different color from the first illumination light, is emitted from the room lamp section.

20. The in-vehicle illumination device according to claim 19, wherein the light guide plate has a shape that a portion of the side surface is partially notched, and the map lamp section is at least partially located inside of the notch.

* * * * *